United States Patent
Nishino (10) Patent No.: US 9,873,482 B2
(45) Date of Patent: Jan. 23, 2018

(54) BICYCLE FRONT DERAILLEUR

(71) Applicant: Shimano Inc., Sakai, Osaka (JP)

(72) Inventor: Takafumi Nishino, Sakai (JP)

(73) Assignee: Shimano Inc., Osaka (JP)

( * ) Notice: Subject to any disclaimer, the term of this patent is extended or adjusted under 35 U.S.C. 154(b) by 61 days.

(21) Appl. No.: 14/879,103

(22) Filed: Oct. 9, 2015

(65) Prior Publication Data
US 2017/0101160 A1    Apr. 13, 2017

(51) Int. Cl.
| | | |
|---|---|---|
| F16H 9/00 | (2006.01) | |
| F16H 59/00 | (2006.01) | |
| F16H 61/00 | (2006.01) | |
| F16H 63/00 | (2006.01) | |
| B62M 9/132 | (2010.01) | |
| B62M 9/135 | (2010.01) | |
| B62M 25/00 | (2006.01) | |

(52) U.S. Cl.
CPC ............ B62M 9/132 (2013.01); B62M 9/135 (2013.01); B62M 2025/006 (2013.01)

(58) Field of Classification Search
CPC ...... B62M 9/132; B62M 25/08; B62M 9/135; B62M 9/122; B62M 9/1342
USPC .................................................... 474/80, 82
See application file for complete search history.

(56) References Cited

U.S. PATENT DOCUMENTS

| | | | | |
|---|---|---|---|---|
| 6,623,389 B1* | 9/2003 | Campagnolo | .......... | B62M 9/122 474/70 |
| 6,648,782 B2* | 11/2003 | Valle | ...................... | B62M 9/132 474/78 |
| 6,979,009 B2* | 12/2005 | Ichida | .................... | B62M 25/08 280/238 |
| 7,291,079 B2* | 11/2007 | Ichida | .................... | B62M 25/08 474/80 |
| 7,306,531 B2* | 12/2007 | Ichida | .................... | B62M 9/122 474/70 |
| 7,331,890 B2* | 2/2008 | Ichida | .................... | B62M 9/132 474/80 |
| 7,341,532 B2* | 3/2008 | Ichida | .................... | B62M 25/08 474/70 |
| 7,442,136 B2* | 10/2008 | Ichida | .................... | B62M 9/132 474/80 |
| 7,503,863 B2* | 3/2009 | Ichida | .................... | B62M 25/08 474/70 |
| 7,704,173 B2* | 4/2010 | Ichida | .................... | B62M 9/132 474/80 |
| 7,980,974 B2* | 7/2011 | Fukuda | .................. | B62M 9/122 474/70 |
| 8,025,597 B2* | 9/2011 | Takamoto | .............. | B62M 9/122 474/70 |
| 8,033,937 B2* | 10/2011 | Meggiolan | ............. | B62M 9/132 474/70 |

(Continued)

*Primary Examiner* — Henry Y Liu (57) ABSTRACT

An electric front derailleur for a bicycle. The derailleur includes a chain guide, a linkage assembly movably connected to the chain guide, and an electrical actuation unit operatively coupled to the linkage assembly to move the chain guide with respect to the electrical actuation unit. The electrical actuation unit includes a mounting portion configured to be attached to a bicycle frame. The mounting portion is secured to the electrical actuation unit. The mounting portion permits the position of the electric front derailleur to be adjusted with respect to the bicycle frame.

19 Claims, 10 Drawing Sheets

(56) References Cited

U.S. PATENT DOCUMENTS

| | | | | |
|---|---|---|---|---|
| 8,241,158 B2* | 8/2012 | Ishikawa | | B62M 25/08 474/80 |
| 8,282,519 B2* | 10/2012 | Ichida | | B62M 9/132 474/82 |
| 8,574,105 B2* | 11/2013 | Auer | | B62M 9/135 474/80 |
| 8,864,611 B2* | 10/2014 | Kuwayama | | B62M 9/1344 474/80 |
| 8,888,620 B2* | 11/2014 | Emura | | B62M 9/135 474/80 |
| 8,979,683 B2* | 3/2015 | Katsura | | B62M 25/08 474/80 |
| 2005/0192137 A1* | 9/2005 | Ichida | | B62M 9/132 474/70 |
| 2005/0192139 A1* | 9/2005 | Ichida | | B62M 25/08 474/80 |
| 2005/0192140 A1* | 9/2005 | Meggiolan | | B62M 9/122 474/80 |
| 2005/0197222 A1* | 9/2005 | Tatsumi | | B62M 9/132 474/80 |
| 2005/0205323 A1* | 9/2005 | Ichida | | B62M 25/08 474/80 |
| 2005/0239587 A1* | 10/2005 | Ichida | | B62M 9/122 474/82 |
| 2005/0266945 A1* | 12/2005 | Meggiolan | | B62M 9/132 474/70 |
| 2006/0189421 A1* | 8/2006 | Ichida | | B62M 9/132 474/80 |
| 2006/0189422 A1* | 8/2006 | Ichida | | B62M 25/08 474/80 |
| 2006/0258494 A1* | 11/2006 | Auer | | B62M 9/135 474/80 |
| 2007/0037645 A1* | 2/2007 | Ishikawa | | B62M 25/08 474/80 |
| 2007/0184925 A1* | 8/2007 | Ichida | | B62M 25/08 474/80 |
| 2007/0191159 A1* | 8/2007 | Fukuda | | B62M 9/1242 474/82 |
| 2007/0207885 A1* | 9/2007 | Watarai | | B62M 25/08 474/70 |
| 2008/0132364 A1* | 6/2008 | Ichida | | B62M 25/08 474/70 |
| 2013/0192405 A1* | 8/2013 | Katsura | | B62M 25/08 74/473.12 |
| 2014/0114538 A1* | 4/2014 | Shipman | | B62M 9/132 701/51 |
| 2014/0128189 A1* | 5/2014 | Kuwayama | | B62M 9/1342 474/82 |
| 2014/0128190 A1* | 5/2014 | Emura | | B62M 9/1342 474/82 |
| 2014/0148287 A1* | 5/2014 | Tachibana | | B62M 9/132 474/82 |
| 2014/0155204 A1* | 6/2014 | Emura | | B62M 9/135 474/80 |
| 2014/0155205 A1* | 6/2014 | Kuwayama | | B62M 9/135 474/80 |
| 2014/0243126 A1* | 8/2014 | Kuwayama | | B62M 9/132 474/80 |
| 2014/0243128 A1* | 8/2014 | Pasqua | | B62M 9/134 474/80 |
| 2014/0287856 A1* | 9/2014 | Kuwayama | | B62M 9/132 474/80 |
| 2015/0353166 A1* | 12/2015 | Kuwayama | | B62M 9/132 474/82 |

\* cited by examiner

BICYCLE FRONT DERAILLEUR

BACKGROUND OF THE INVENTION

The invention generally relates to a front derailleur for a bicycle, and more particularly, to a mounting structure of an electrical actuation unit of an electric front derailleur.

A derailleur mounting bracket is often welded or otherwise fixed to the seat tube of the bicycle frame to support a front derailleur. A drawback of the derailleur mounting bracket is that it does not allow for variation in the size difference between different front sprockets; thus, different front derailleurs may be necessary to accommodate different sprockets.

SUMMARY OF THE INVENTION

The invention is basically an electric front derailleur including a chain guide, a linkage assembly movably connected to the chain guide, and an electrical actuation unit operatively coupled to the linkage assembly to move the chain guide with respect to the electrical actuation unit. The electrical actuation unit includes a mounting portion configured to be attached to a bicycle frame, and the mounting portion is secured to the electrical actuation unit.

In another aspect, the mounting portion has one of a convex surface and a concave surface, the bicycle frame includes a mounting bracket having the other of the convex surface and the concave surface, and the convex surface is configured to engage with the concave surface.

In another aspect, the mounting portion has a bore, which is adapted to receive a fastener for fixing the mounting portion to the bicycle frame.

In another aspect, the bore is a threaded bore.

In another aspect, the bore has a central bore axis extending in a front-rear direction in a state where the mounting portion is attached to the bicycle frame.

In another aspect, the bore is a first bore, the mounting portion includes a second bore, and the first and second bores are configured to selectively receive the fastener for attaching the mounting portion to the bicycle frame, wherein selection of one of the first and second bores adjusts a position of the chain guide with respect to the bicycle frame.

In another aspect, the mounting portion is detachable from the electrical actuation unit.

In another aspect, the mounting portion is configured to allow the orientation of the mounting portion with respect to the electrical actuation unit to be changed to adjust a position of the chain guide.

In another aspect, the electrical actuation unit has a first housing containing an electrical motor to actuate the linkage assembly, and the first housing has a recess to receive the mounting portion.

In another aspect, the recess is a blind hole.

In another aspect, the electrical actuation unit has a first housing containing an electrical motor to actuate the linkage assembly, and the mounting portion is integrally formed with the first housing of the electrical actuation unit.

In another aspect, the first housing of the electrical actuation unit is made of a first material, the mounting portion is made of a second material, and the first and second materials are different from one another.

In another aspect, the electrical actuation unit has a first housing containing an electrical motor to actuate the linkage assembly, and the first housing of the electrical actuation unit and the mounting portion are made of different materials, respectively.

In another aspect, the first housing of the electrical actuation unit is made of a resin material and the mounting portion is made of a metallic material.

In another aspect, the electrical actuation unit has a first housing containing an electrical motor to actuate the linkage assembly, and the first housing of the electrical actuation unit is made of a resin material.

In another aspect, the electric front derailleur includes a wireless communication unit contained within the first housing.

In another aspect, the electrical actuation unit has a first housing containing an electrical motor to actuate the linkage assembly, the first housing of the electrical actuation unit has a front end, and the mounting portion extends downwardly from the front end.

In another aspect, the mounting portion and the linkage assembly are at least partly overlapping with each other as viewed from a direction perpendicular to the vertical direction in a state where the mounting portion is mounted to a mounting bracket of the bicycle frame.

In another aspect, the electric front derailleur includes a power supply unit.

In another aspect, the electrical actuation unit includes a first housing, and the power supply unit includes a second housing that is removably coupled to the first housing of the electrical actuation unit.

In another aspect, the first housing of the electrical actuation unit has a front housing portion and a rear housing portion, and the second housing of the power supply unit is coupled to the rear housing portion, and the mounting portion is coupled to the front housing portion.

In another aspect, the electric front derailleur includes a base member, and the electrical actuation unit is attached to the base member through the mounting portion.

Other advantages and features of the present invention will become apparent to those skilled in the art from the following detailed description and the drawings.

DESCRIPTION OF THE EMBODIMENTS

Figure 1:
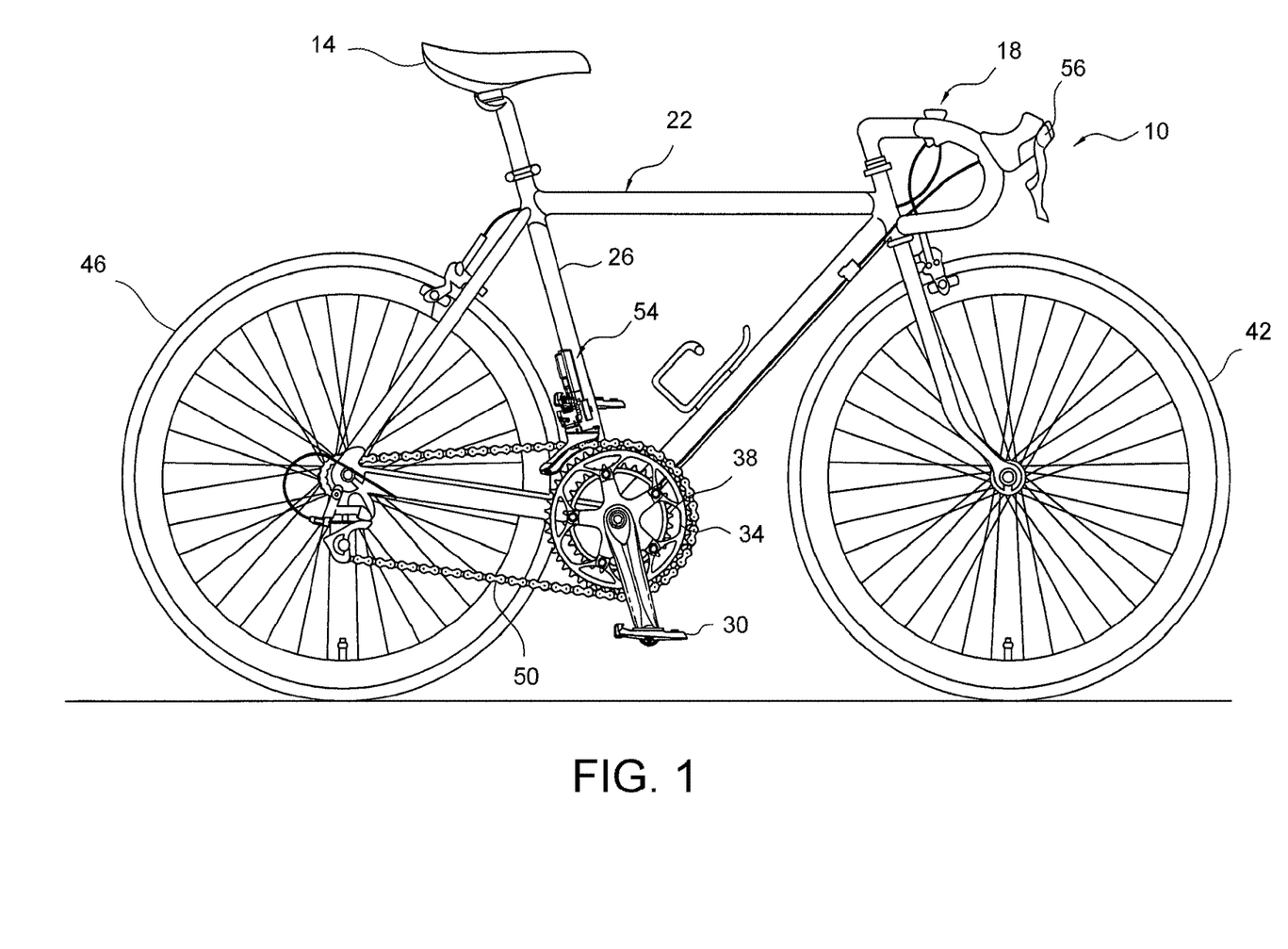
FIG. 1 is a side view of a bicycle including an embodiment of an electric front derailleur according to the invention.

FIG. 1 shows a bicycle 10 that includes a seat 14, handlebars 18, a frame 22, a seat tube 26, pedals 30, a large sprocket 34, a small sprocket 38, a front wheel 42, a rear wheel 46, a chain 50, and an electric front derailleur assembly 54. An operating device 56, which permits the rider to control the front derailleur assembly 54, is located on the handlebars 18. For reference purposes, the bicycle 10 includes a center plane 58 (See FIG. 6), which includes a center axis 62 of the seat tube 26, extends in a longitudinal direction of the bicycle 10, and is perpendicular to an axis of the rear wheel 46. These and other unnumbered parts of the bicycle 10 are well known in the art and will not be discussed or illustrated in detail, except to the extent that they are modified in conjunction with the present invention.

Referring to FIGS. 2, 3, and 6-8 the electric front derailleur 54 basically includes a chain guide 90, a linkage assembly 94, which is movably connected to the chain guide 90, and an electrical actuation unit 98, which is operatively coupled to the linkage assembly 94 to move the chain guide 90 with respect to the electrical actuation unit 98. The electrical actuation unit 98 includes a mounting portion 102, which is configured to be attached to the bicycle frame 22. The mounting portion 102 is secured to the electrical actuation unit 98.

The mounting portion 102 has a bore 106, which is adapted to receive a fastener 114 for fixing the mounting portion 102 to the bicycle frame 22. The fastener 114, in this embodiment, is a threaded bolt, as shown in FIG. 3. In the illustrated embodiment of FIG. 2, the bore 106 is a threaded bore. The mounting portion 102 is coupled to the seat tube 26 of the bicycle 10 by a mounting bracket 118, which is welded or otherwise fastened to the seat tube 26. The mounting bracket 118 includes a through hole (unnumbered) for receiving the fastener 114. Thus, the mounting portion 102 couples the electric derailleur 54 to the seat tube 26 of the bicycle frame 22 through the mounting bracket 118.

Figure 2:
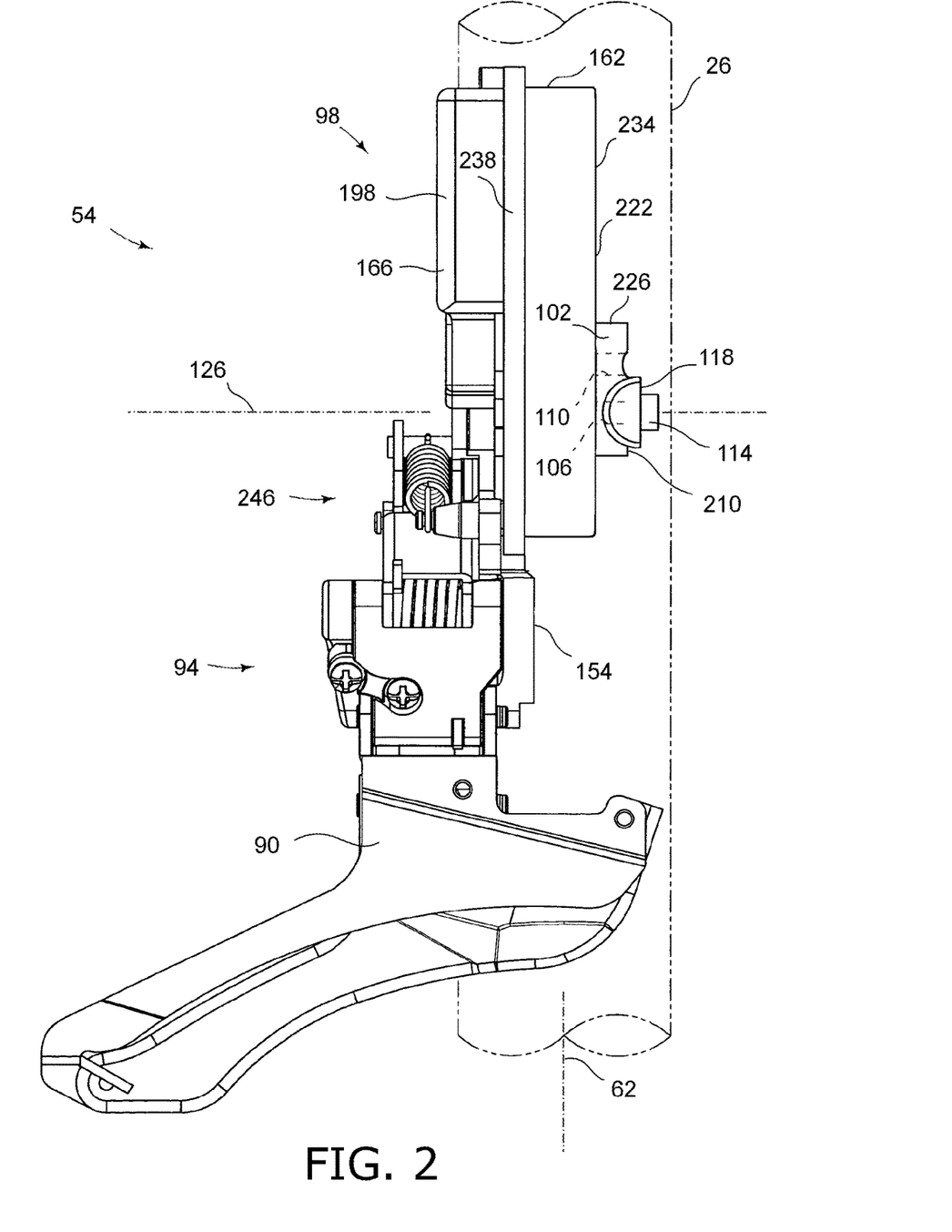
FIG. 2 is a side view of the electric front derailleur of a first embodiment.
Figure 3:
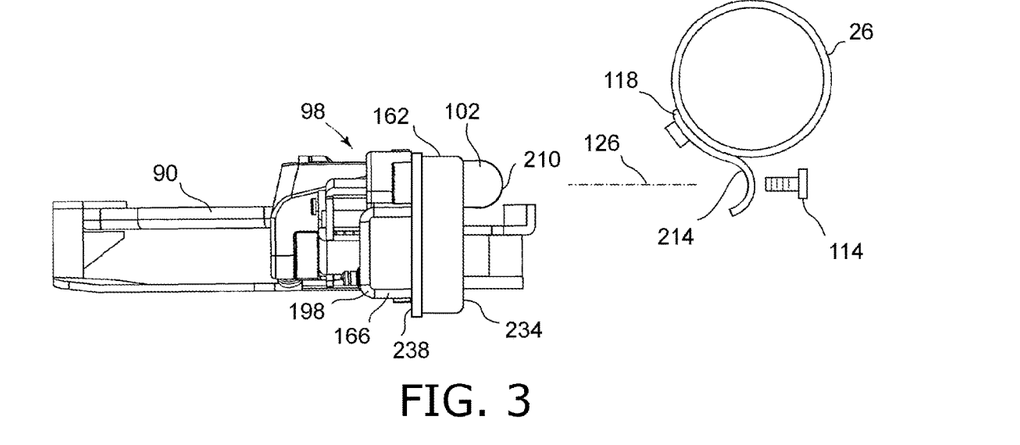
FIG. 3 is an exploded top view of the electric front derailleur of FIG. 2 and a seat tube of a bicycle frame.

Although the bore 106 is preferably a threaded bore in the embodiment of FIG. 2, the bore 106 can be a through hole, and a nut (not illustrated) can be provided, for example, behind the bore 106 to receive an end of a threaded fastener to secure the front derailleur 54 to the mounting bracket 118.

The bore 106 has a central bore axis 126 extending in a front-rear direction in a state where the mounting portion 102 is attached to the bicycle frame 22. The central bore axis 126 is preferably parallel to the center plane 58 and horizontal when the front derailleur 54 is mounted to the seat tube 26 via the mounting portion 102 and the bicycle 10 is the upright position of FIG. 1.

Figure 6:
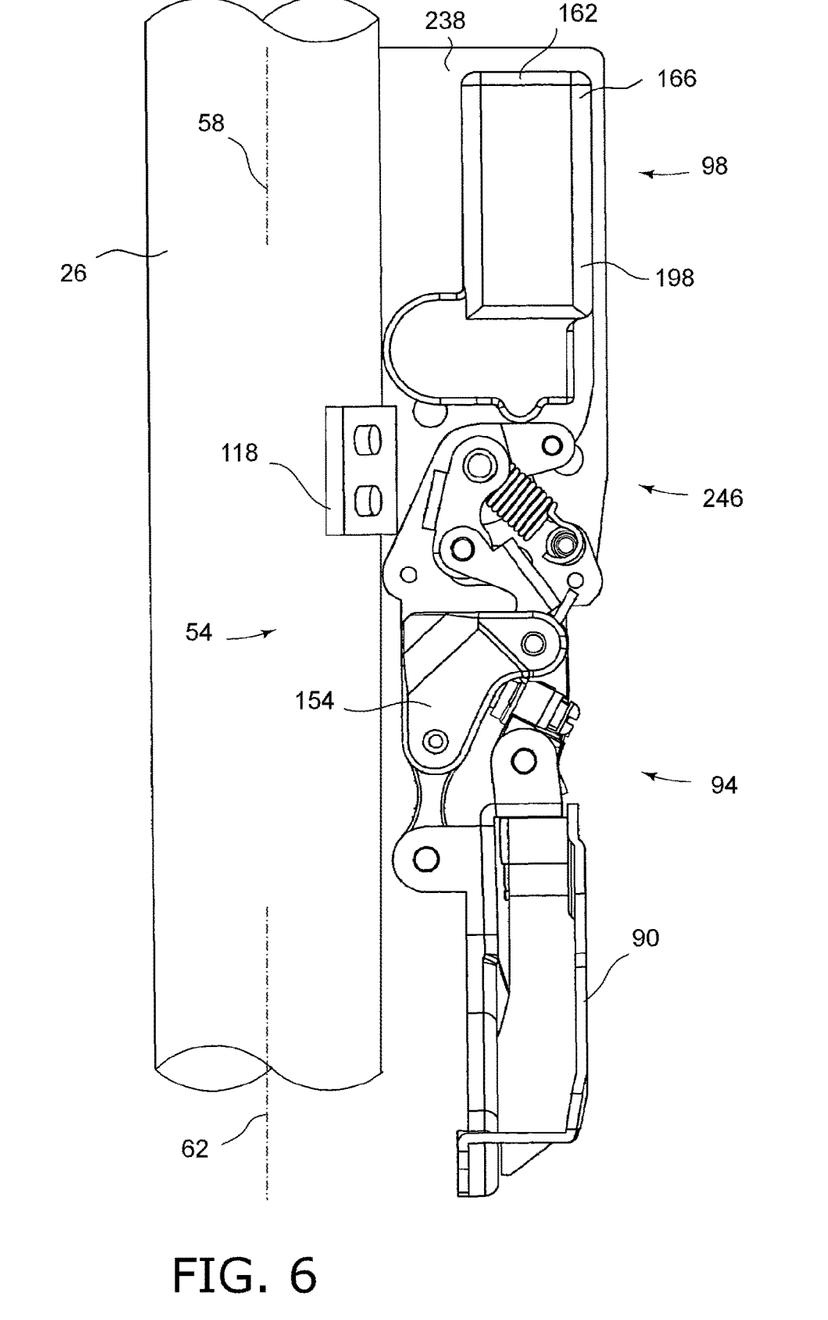
FIG. 6 is a rear view of the electric front derailleur of FIG. 2.
Figure 7:
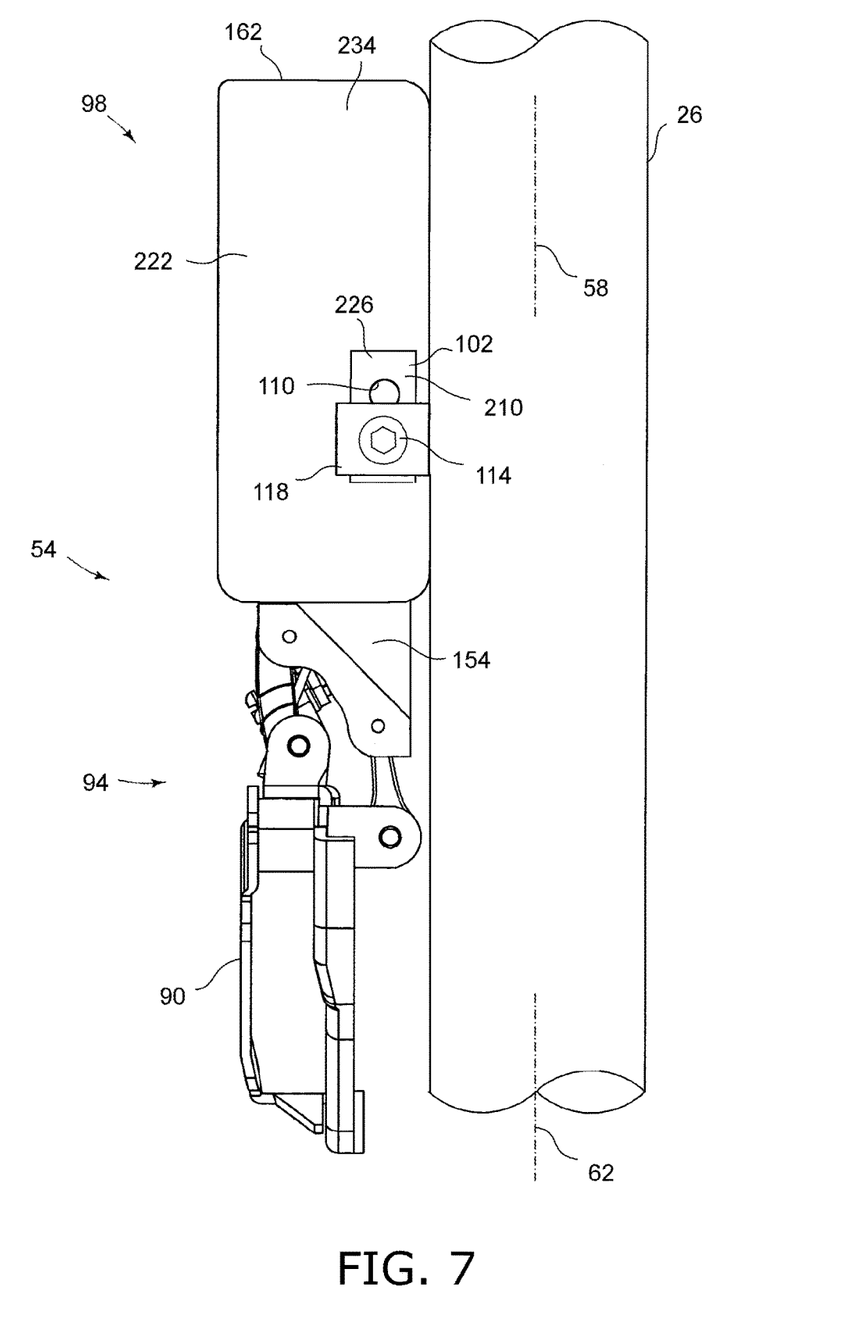
FIG. 7 is a front view of the electric front derailleur of FIG. 2.

The electric front derailleur 54 is constructed to move between at least a retracted position and an extended position. As best seen in FIGS. 6 and 7, the front derailleur 54 includes a base member 154, which, along with the chain guide 90 and the linkage assembly 94 forms a four-bar linkage mechanism for shifting the chain guide 90 with respect to the base member 154. The base member 154 is a stationary member of the four-bar linkage mechanism. The linkage assembly 94 permits lateral movement of the chain guide 90 between at least the retracted position and extended shift position, i.e., at least first and second shift positions. The basic operation of shifting the chain 50 is well-known and thus will not be described or shown in detail.

Figure 4:
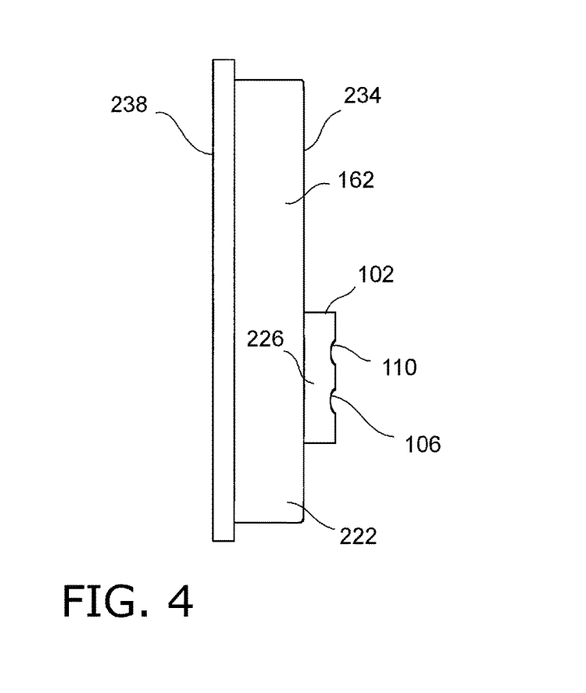
FIG. 4 is a side view of a front housing of an electrical actuation unit of the electric front derailleur of FIG. 2.

The electric actuation unit 98 includes a first housing 162 and a second housing 166. The second housing 166 is removably coupled to the first housing 162 of the electric actuation unit 98. The first housing 162 and the second housing 166 are illustrated in their coupled state; however, the second housing 166 can be separated from the first housing 162 by, for example, removing fasteners (not illustrated) that secure the second housing 166 to the first housing 162. FIG. 4 shows the first housing 162 uncoupled from the second housing 166. Alternatively, a manually operated latch (not illustrated) can be provided to permit easy coupling and uncoupling of the second housing 162 without the use of fasteners.

Figure 5:
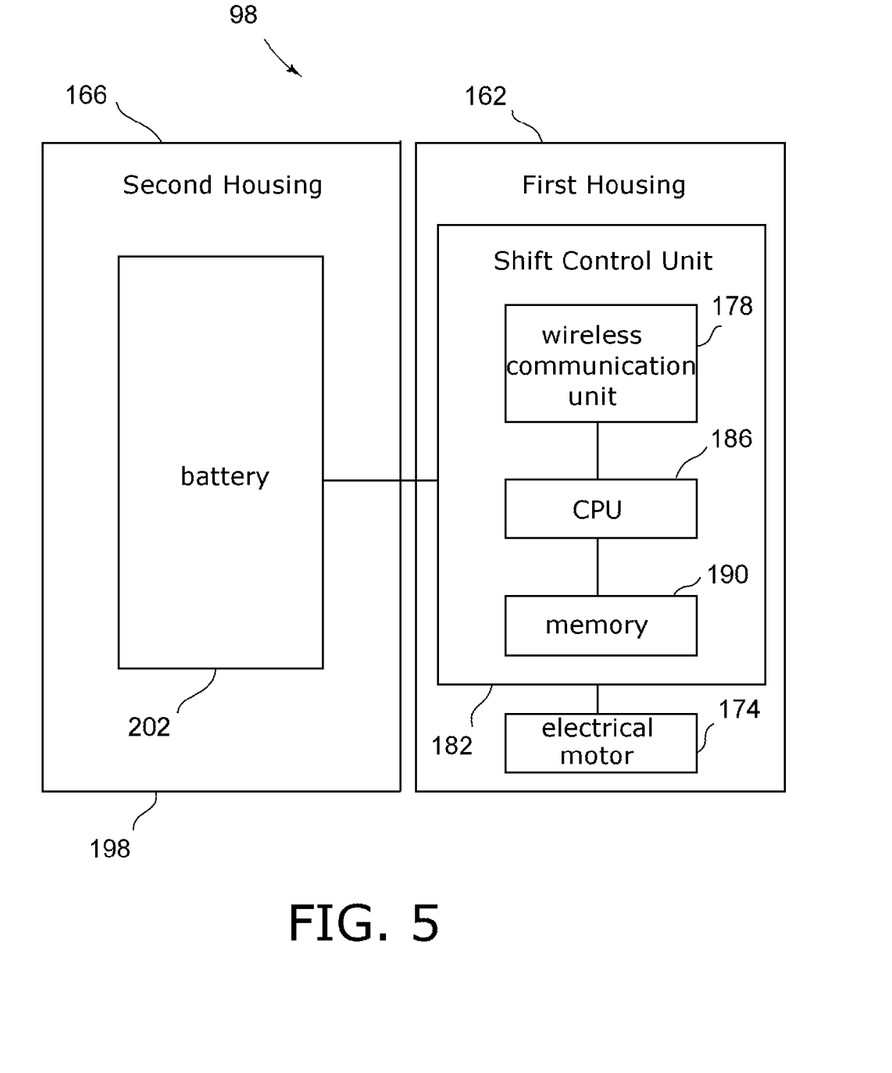
FIG. 5 is a block diagram of an electrical actuation unit of the electric front derailleur of FIG. 2.

FIG. 5 is a block diagram of the electrical actuation unit 98. As shown in FIG. 5, the first housing 162 contains an electrical motor 174 to actuate the linkage assembly 94. Further, a wireless communication unit 178 is contained within the first housing 162. The wireless communication unit 178 can be, for example, composed of an ANT module configured to receive the wireless signals from the operating device 56 using the predetermined ANT protocol. However, the wireless communication unit 178 can include another type of wireless module. In this embodiment, the wireless communication unit 178 is part of a shift control unit 182. In this embodiment, the first housing 162 contains, the shift control unit 182, the wireless communication unit 178, a central processing unit (CPU) 186, a memory 190, for storing programs and data, and the electrical motor 174, which is electrically coupled to and controlled by the shift control unit 182. At least one of the wireless communication unit 178, a central processing unit 186 and a memory 190 can be located outside of the first housing. Further, at least one of the wireless communication unit 178, a central processing unit 186 and a memory 190 can be configured to be included in other electrical bicycle components. The wireless communication unit 178 is used for receiving a wireless signal to shift the chain guide 90 or to update the programs (firmware) stored in the memory 190, for example. The details of the wireless function and motor control of an electric front derailleur are known in the art and will not be described in detail herein. In the present invention, however, the electric front derailleur 54 can be configured without the wireless communication unit 178. In such a case, the electric front derailleur 54 can receive an operation signal or other signal, from an operation device (a switch unit) or the other wireless unit via an electrical cable.

As shown in FIGS. 2, 3, and 6, the electric front derailleur 54 includes a power supply unit 198. The power supply unit 198 is electrically coupled to the shift control unit 182 to power the shift control unit 182 and the electrical motor 174. The power supply unit 198 includes the second housing 166, which is removably coupled to the first housing 162 of the electrical actuation unit 98. More specifically, the first housing 162 of the electrical actuation unit 98 has a front housing portion 234 and a rear housing portion 238, and the second housing 166 of the power supply unit 198 is coupled to the rear housing portion 238. The mounting portion 102 is coupled to the front housing portion 234. The front housing portion 234 corresponds to the front of the bicycle 10, and the rear housing portion 238 corresponds to the rear of the bicycle 10, when the electric front derailleur 54 is fixed to the bicycle 10. In the present invention, however, the electric front derailleur 54 can be configured without the power supply unit 198. In such a case, the electric front derailleur 54 can be supplied with electrical power from a power supply unit that is included in another bicycle component via an electrical cable electrically coupling the electric front derailleur 54 and the power supply unit.

The power supply unit 198 includes a source of power, such as a battery 202. When the first housing 162 is coupled to the second housing 166, the battery 202 is electrically coupled to the shift control unit 182. For example, the first housing 162 and the second housing 166 can be provided with exposed electric terminals (not illustrated) that are located to contact one another when the first housing 162 is coupled to the second housing 166.

The linkage assembly 94 is operatively coupled to a motor linkage 246 to move the chain guide 90 between the first shift position and the second shift position in response to operation of the electrical motor 174. Details of the motor linkage 246 are known in the art and will not be described here.

As shown in FIG. 3, in the illustrated embodiments, the mounting portion 102 has a convex surface 210 and the mounting bracket 118 has a concave surface 214. However, this configuration can be reversed such that the mounting portion 102 has a concave surface 214 and the mounting bracket 118 has a convex surface 210. In other words, the mounting portion 102 has one of a convex surface 210 and a concave surface 214, and the bicycle frame 22 includes the mounting bracket 118, which has the other of the convex surface 210 and the concave surface 214. The convex surface 210 is configured to engage with the concave 214 surface when the mounting portion 102 is secured to the mounting bracket 118.

The first housing 162 of the electrical actuation unit 98 is made of a first material 222, the mounting portion 102 is made of a second material 226, and the first and second materials 222, 226 are different from one another. In other words, the first housing 162 of the electrical actuation unit 98 and the mounting portion 102 are made of different materials, respectively. Preferably, the first housing 162 of the electrical actuation unit 98 is made of a resin material and the mounting portion 102 is made of a metallic material. For example, the mounting portion 102 can be made of aluminum alloy.

In the embodiment of FIGS. 2, 3, and 6-8, the mounting portion 102 is integrally formed with the first housing 162 of the electrical actuation unit 98. Although the mounting portion 102 is preferably made of metallic material and the first housing 162 is preferably made of a resin material, the mounting portion 102 can be integrally formed with the first housing 162 by, for example, insert molding. Alternatively, the mounting portion 102 can be a separate member that is fastened to the first housing 162.

Figure 8:
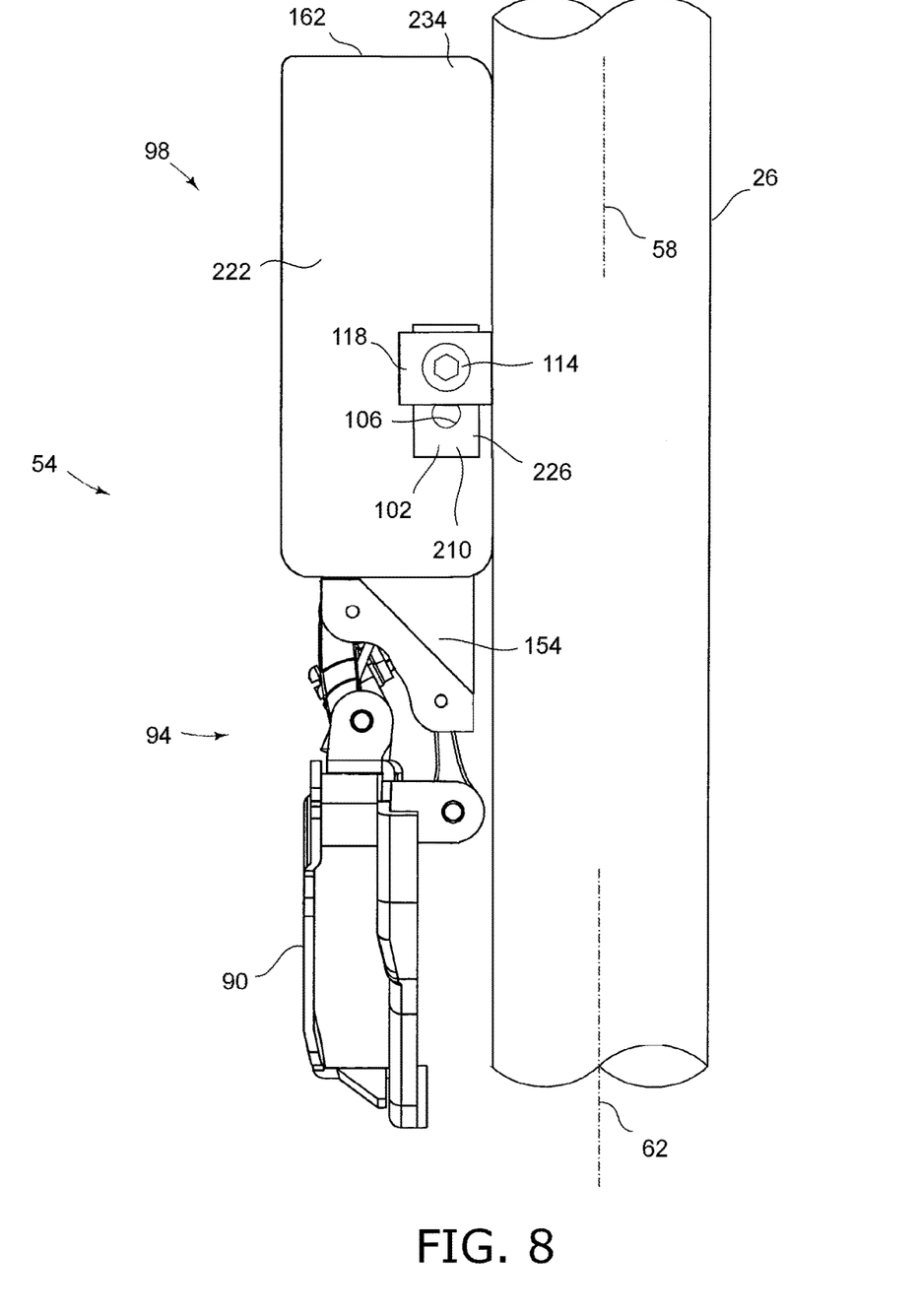
FIG. 8 is a front view of the electric front derailleur of FIG. 2.

In the embodiment of FIGS. 2, 3, and 6-8, the bore 106 is a first bore, and the mounting portion 102 includes a second bore 110, and the first and second bores 106, 110 are configured to selectively receive the fastener 114 for attaching the mounting portion 102 to the bicycle frame 22. Selection of one of the first and second bores 106, 110 adjusts the position of the chain guide 90 with respect to the bicycle frame 22, in a direction along the center axis 62 of the seat tube 26. The second bore 110 is, like the first bore 106, a threaded bore. FIG. 2 and FIG. 7 show the mounting portion 102 fastened to the first bore 106. FIG. 8 shows the mounting portion 102 fastened to the second bore 110. The electric front derailleur 54 is mounted at a relatively higher position in FIG. 7 in comparison to FIG. 8. Thus, the height of the electric front derailleur 54 can be adjusted by choosing between one of the first and second bores 106, 110. Additional adjustment bores can be formed in the mounting portion 102 for additional adjustment levels. This allows sprockets of varying sizes to be accommodated by one electric front derailleur 54. Further, the second bore 110 can be omitted from the electric front derailleur 54.

Figure 9:
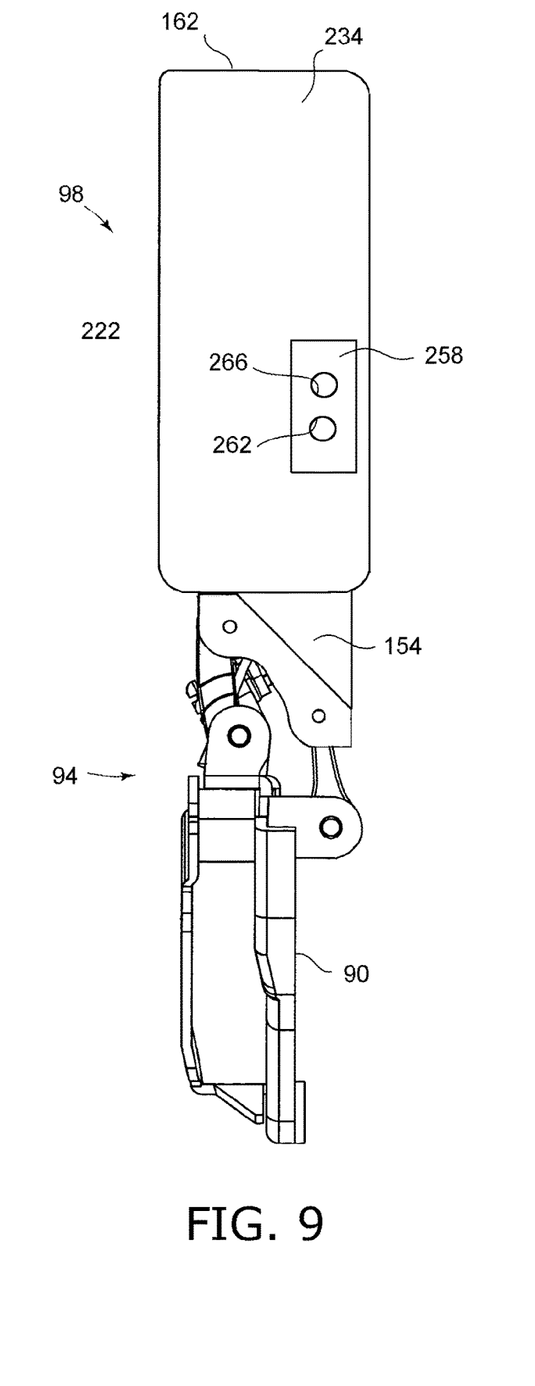
FIG. 9 is a front view of an electric front derailleur of a further embodiment of the invention.
Figure 10:
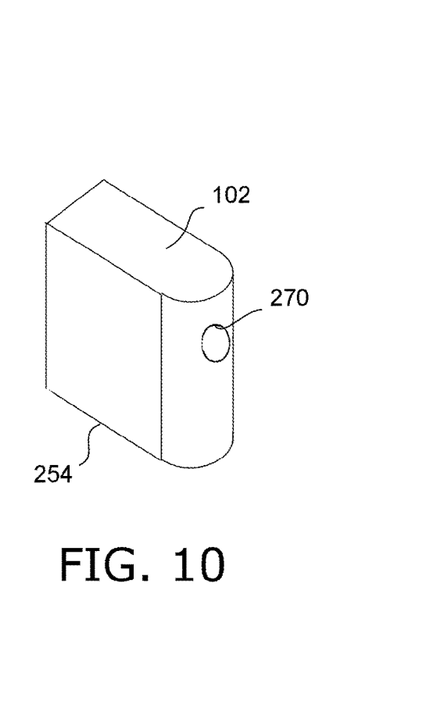
FIG. 10 is a perspective view of a removable element of the embodiment of FIG. 9.

FIGS. 9 and 10 show an additional embodiment. Except as described below, an electric front derailleur 54b of FIGS. 9 and 10 is the same as the electric front derailleur 54 described above. Referring to FIGS. 9 and 10, in a second embodiment, a removable element 254 serves as the mounting portion 102. A bore 270 is formed in the removable element 254 to receive a fastener (not illustrated). The bore 270 is a threaded bore or through hole. In this embodiment, the bore is a through hole. The fastener used in the illustrated embodiment of FIGS. 9 and 10 is a threaded bolt. In this embodiment, the mounting portion 102 is detachable from the electrical actuation unit 98. The first housing has a recess 258 to receive the mounting portion 102. In this embodiment, the recess 258 is a blind hole. The recess 258 and the removable element 254 are sized to permit the removable element 254 to fit within the recess 258. In this embodiment, the mounting portion 102 is configured to allow the orientation of the mounting portion 102 with respect to the electrical actuation unit 98 to be changed to adjust the position of the chain guide 90. In other words, to change the height of the electrical front derailleur 54b, or the position of the chain guide 90 in an axial direction of the seat tube 26, an operator changes the orientation of the removable element 254 with respect to the recess 258 by one hundred and eighty degrees. Although the recess 258 and the removable element 254 are rectangular in the illustrated embodiment, the recess 258 and the removable element 254 can have other shapes, such as an oval shape, as long as the shape permits a change in orientation.

As shown in FIG. 9, a first recess bore 262 and a second recess bore 266 are formed in the bottom of the recess 258. In one variation, the recess bores 262, 266 are threaded to engage the end of the fastener to secure the mounting portion 102 to the electrical actuation unit 98 when the fastener is secured to the mounting bracket 118. In another variation (not illustrated), the recess bores 262 and 266 are through holes, and a threaded nut is provided at the rear of the electrical actuation unit 98 to engage with the fastener to secure the mounting portion 102 to the electrical actuation unit 98 when the fastener is secured to the mounting bracket 118. In this variation, the threaded opening of the nut can be positioned to align with either the first recess bore 262 or the second recess bore 266 in accordance with the orientation of the removable element 254 and the location of the fastener. Further, if a nut is used to engage the fastener, a single elongated opening can replace the two recess bores 262, 266.

In the embodiment of FIGS. 9 and 10, the bore 270 can be a threaded bore to engage the threads of the fastener 114. In this case, the recess bores 262 and 266 can be eliminated, and a latch or other fastener (unillustrated) can be employed to retain the removable element 254 in the recess 258, while permitting the removable element 254 to be removed when it is desired to change its orientation.

Figure 11:
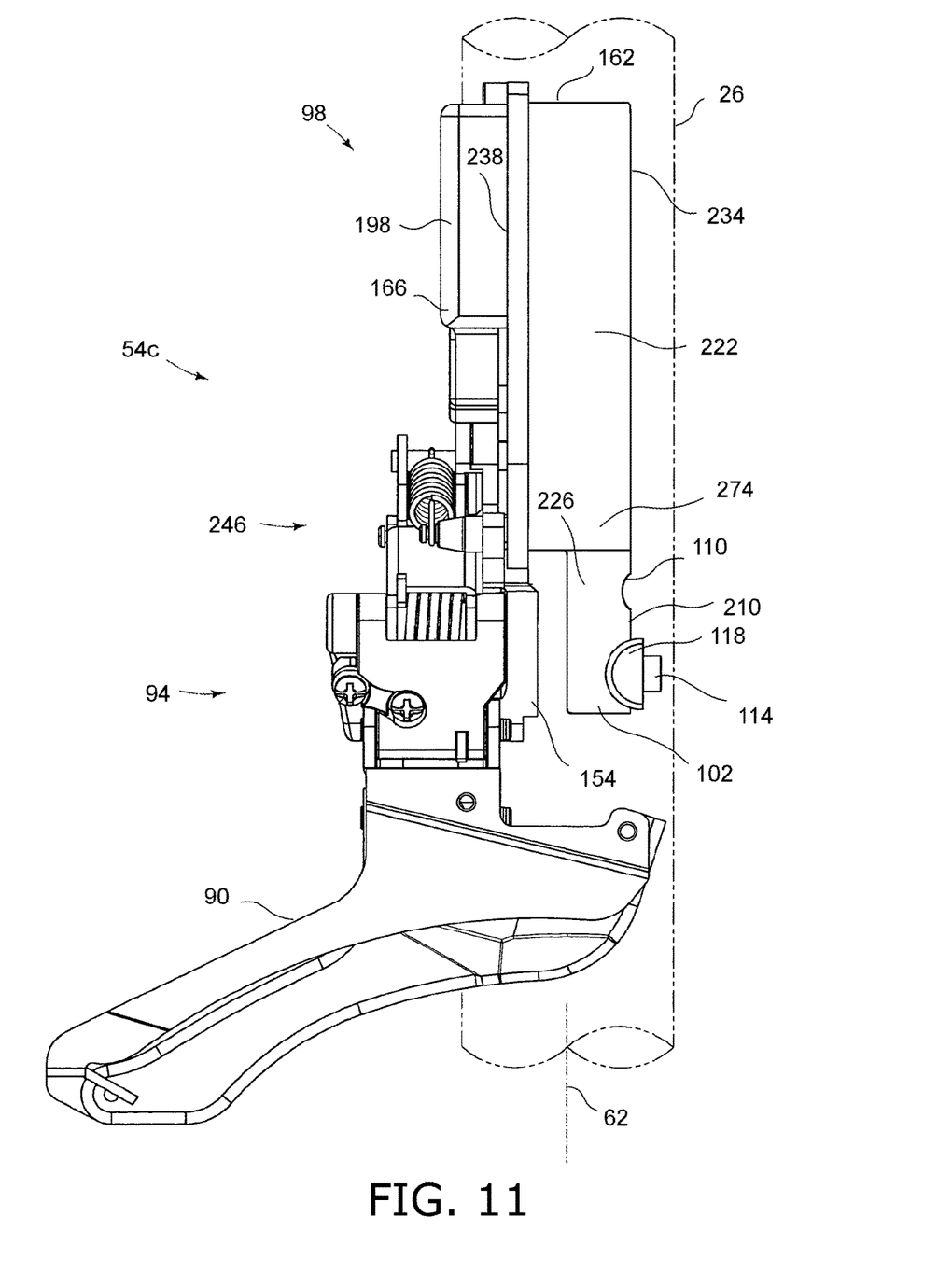
FIG. 11 is a side view of an electric front derailleur of a further embodiment of the invention.

FIG. 11 shows an additional embodiment. Except as described below, an electric front derailleur 54c of FIG. 11 is the same as the electric front derailleur 54 described in connection with FIGS. 2, 3, and 6-8. Referring to FIG. 11, the first housing 162 of the electrical actuation unit 98 has a front end 274, and the mounting portion 102 extends downwardly from the front end 274. The front end 274 corresponds to the front of the bicycle 10 when the electric front derailleur 54c is fixed to the bicycle 10. This permits the electrical front derailleur 54c to be used with a mounting bracket 118 that is positioned lower on the seat tube 26 in comparison to the position of the mounting bracket 118 in FIG. 2, for example.

The length of the downward extension of the mounting portion 102 from the front end 274 can be varied. Preferably, referring to FIG. 11, the mounting portion 102 and the linkage assembly 94 are at least partly overlapping with each other as viewed from a direction perpendicular to the vertical direction (the axial direction of the seat tube 26) in a state where the mounting portion 102 is mounted to the mounting bracket 118 of the bicycle frame 22. In other words, at least part of the mounting portion 102 and at least part of the linkage assembly 94 are at the same height when the bicycle 10 is in the upright position of FIG. 1 and as viewed in FIG. 11.

In the illustrated embodiment of FIG. 11, the mounting portion 102 is preferably formed integrally with the first housing 162. However, the mounting portion 102 can be formed separately and fastened to the first housing 162.

Figure 12:
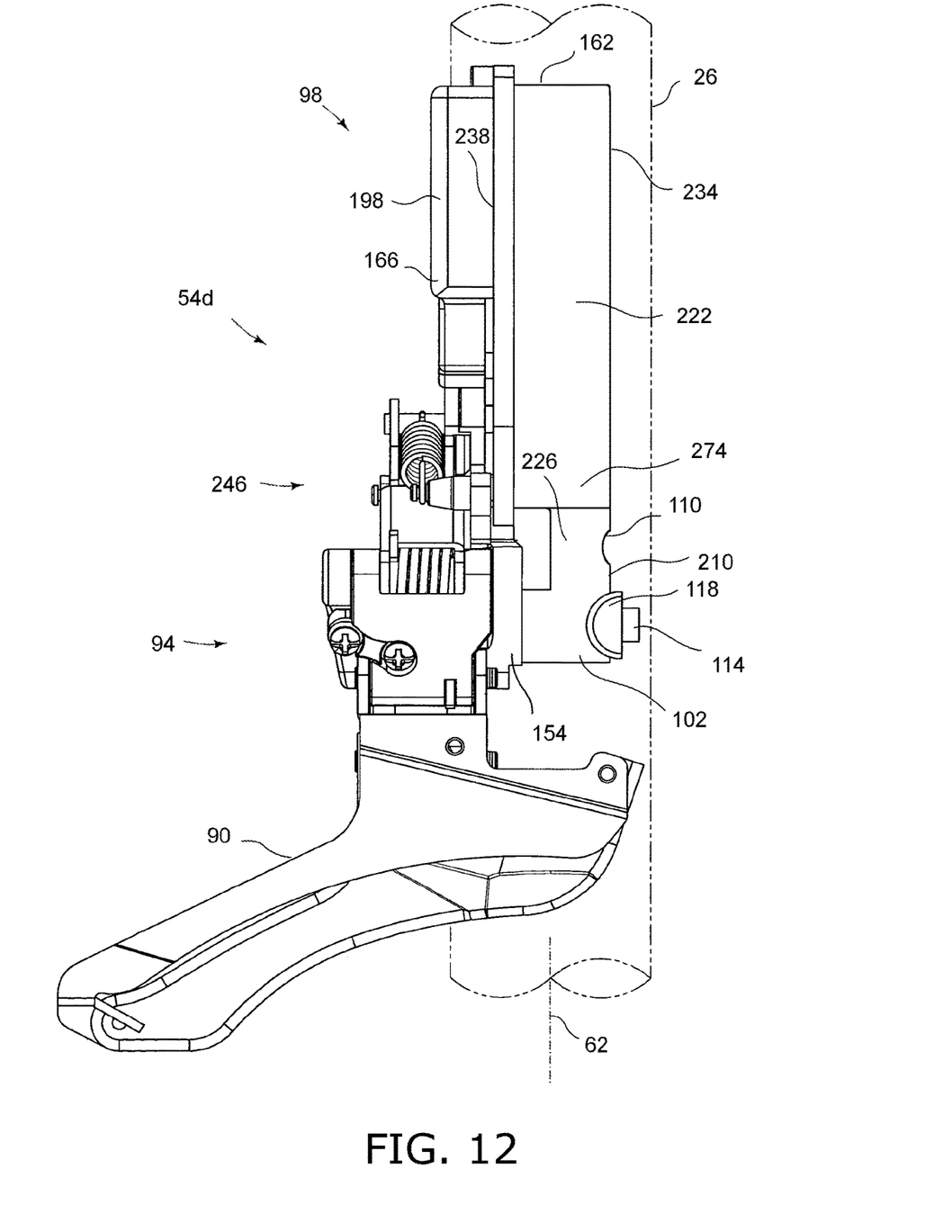
FIG. 12 is a side view of an electric front derailleur of a further embodiment of the invention

FIG. 12 shows an additional embodiment. Except as described below, an electric front derailleur 54*d* of FIG. 12 is the same as the electric front derailleur 54 described in connection with FIGS. 2-8. Referring to FIG. 12, the electrical actuation unit 98 is attached to the base member 154 through the mounting portion 102. As shown in FIG. 12, as in the embodiment of FIG. 11, the first housing 162 of the electrical actuation unit 98 has a front end 274, and the mounting portion 102 extends downwardly from the front end 274. However, the rear surface of the mounting portion 102 is attached to the base member 154. The electrical actuation unit 98 is attached to the upper end of the mounting portion 102 such that the mounting portion 102 is between the electrical actuation unit 98 and the base member 154. In this embodiment, the mounting portion 102 can be formed integrally with the base member 154 or formed separately and fastened to or engaged with the base member 154. Likewise, in this embodiment, the mounting portion 102 can be formed integrally with the first housing 162 or formed separately and fastened to or engaged with the first housing 162.

The term "detachably attached" or "detachably attaching," as used herein, encompasses configurations in which an element directly attached to another element by directly affixing the element to the other element while the element is detachable from the other element, without damage, and configurations in which the element is indirectly attached to the other element via an intermediate member or members while the element is detachable from the other element and the intermediate member or members, without damage. This concept also applies to words of similar meaning, for example, "detachably joined," "detachably connected," "detachably coupled," "detachably mounted," "detachably bonded," "detachably fixed" and their derivatives.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

The invention claimed is:

1. An electric front derailleur comprising:
a chain guide;
a linkage assembly movably connected to the chain guide;
an electrical actuation unit operatively coupled to the linkage assembly to move the chain guide with respect to the electrical actuation unit; and
a base member forming a four-bar linkage mechanism along with the chain guide and the linkage assembly, wherein
the electrical actuation unit includes a mounting portion configured to be attached to a bicycle frame,
the mounting portion is secured to the electrical actuation unit and is separate from the base member,
the mounting portion has one of a convex surface and a concave surface, the bicycle frame includes a mounting bracket and having the other of the convex surface and the concave surface, and the convex surface is configured to engage with the concave surface,
the mounting portion has a bore, which is adapted to receive a fastener for fixing the mounting portion to the bicycle frame,
the bore has a central bore axis extending in a front-rear direction in a state where the mounting portion is attached to the bicycle frame.

2. The electric front derailleur according to claim 1, wherein the bore is a threaded bore.

3. The electric front derailleur according to claim 1, wherein the bore is a first bore, the mounting portion includes a second bore, and the first and second bores are configured to selectively receive the fastener for attaching the mounting portion to the bicycle frame, wherein selection of one of the first and second bores adjusts a position of the chain guide with respect to the bicycle frame.

4. The electric front derailleur according to claim 1, wherein the mounting portion is detachable from the electrical actuation unit.

5. The electric front derailleur according to claim 4, wherein the mounting portion is configured to allow the orientation of the mounting portion with respect to the electrical actuation unit to be changed to adjust a position of the chain guide.

6. The electric front derailleur according to claim 4, wherein the electrical actuation unit has a first housing containing an electrical motor to actuate the linkage assembly, and the first housing has a recess to receive the mounting portion.

7. The electric front derailleur according to claim 6, wherein the recess is a blind hole.

8. The electric front derailleur according to claim 1, wherein the electrical actuation unit has a first housing containing an electrical motor to actuate the linkage assembly, and the mounting portion is integrally formed with the first housing of the electrical actuation unit.

9. The electric front derailleur according to claim 8, wherein the first housing of the electrical actuation unit is made of a first material, the mounting portion is made of a second material, and the first and second materials are different from one another.

10. The electric front derailleur according to claim 1, wherein the electrical actuation unit has a first housing containing an electrical motor to actuate the linkage assembly, and the first housing of the electrical actuation unit and the mounting portion are made of different materials, respectively.

11. The electric front derailleur according to claim 10, wherein the first housing of the electrical actuation unit is made of a resin material and the mounting portion is made of a metallic material.

12. The electric front derailleur according to claim 1, wherein the electrical actuation unit has a first housing containing an electrical motor to actuate the linkage assembly, and the first housing of the electrical actuation unit is made of a resin material.

13. The electric front derailleur according to claim 12, further comprising a wireless communication unit contained within the first housing.

14. The electric front derailleur according to claim 1, wherein the electrical actuation unit has a first housing containing an electrical motor to actuate the linkage assembly, the first housing of the electrical actuation unit has a front end, and the mounting portion extends downwardly from the front end.

15. The electric front derailleur according to claim 14, wherein the mounting portion and the linkage assembly are at least partly overlapping with each other as viewed from a direction perpendicular to the vertical direction in a state where the mounting portion is mounted to a mounting bracket of the bicycle frame.

16. The electric front derailleur according to claim 1, further comprising a power supply unit.

17. The electric front derailleur according to claim 16, wherein the electrical actuation unit includes a first housing, and the power supply unit includes a second housing that is removably coupled to the first housing of the electrical actuation unit.

18. The electric front derailleur according to claim 17, wherein the first housing of the electrical actuation unit has a front housing portion and a rear housing portion, and the second housing of the power supply unit is coupled to the rear housing portion, and the mounting portion is coupled to the front housing portion.

19. The electric front derailleur according to claim 1, further comprising a base member, wherein the electrical actuation unit is attached to the base member through the mounting portion.

* * * * *